Feb. 23, 1932.   C. H. HAPGOOD   1,846,865
VALVE FOR MILKING MACHINES
Filed Feb. 14, 1931

WITNESS:
Rob R Stebel

INVENTOR
Cyrus Howard Hapgood
BY
Busser and Harding
ATTORNEYS.

Patented Feb. 23, 1932

1,846,865

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

VALVE FOR MILKING MACHINES

Original application filed January 14, 1930, Serial No. 420,669. Divided and this application filed February 14, 1931. Serial No. 515,687.

This application is a division of application, Serial No. 420,669, filed January 14, 1930, for a milking machine and relates to the valve structure therein shown. In said application, and also in another application filed January 14, 1930, Serial No. 420,671, there is set forth a milking machine comprising teat cups, a milk pipe line under vacuum, a special vacuum pipe line, a milk pail, a milk pipe from the teat cups, a milk and air pipe to the pail top, a vacuum pipe to the pail top, and a milk pipe to the pail bottom; all of these pipes leading to a common point at which a master valve is positioned.

The valve is movable into three positions. In one position the valve connects the special vacuum pipe line with the vacuum pipe to the pail top, thereby creating a vacuum in the pail, and also connects the milk pipe from the teat cups with the milk and air pipe to the pail top; thereby causing milk to flow from the teat cups to the pail.

In another position the valve connects with atmosphere the milk and air pipe to the pail and also connects with the milk pipe line the milk pipe to the pail bottom; thereby causing milk to be forced by air pressure from the pail to the milk pipe line.

In a third or neutral intermediate position of the valve all these connections are closed.

The control of the various ports and passages above mentioned and the establishment of various connections between them and the disruption of such connections, by means of a single master valve, greatly simplify the operation of the milker. The subject matter of the present invention is the construction of this master valve.

In the drawings, which show a preferred embodiment of the invention—

Figure 1:
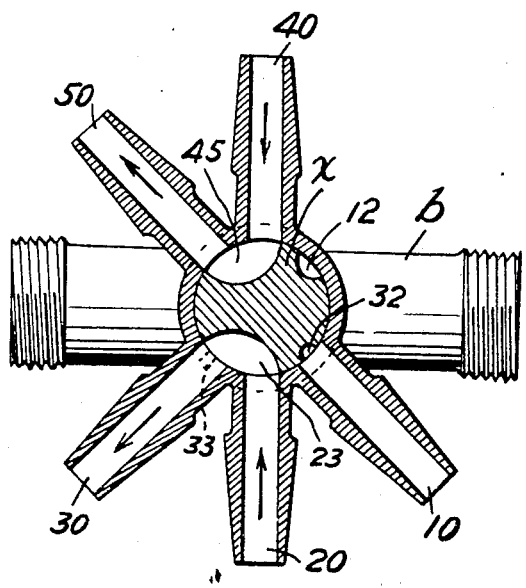
Figs. 1 and 2 are views showing the valve and radiating nozzles in cross-section and the milk pipe in elevation; the valve being shown in two different operative positions in the two figures.

On the milk pipe line $b$ is mounted a conical valve chamber $w$ in open communication with said pipe. Radiating from the valve chamber are five nozzles 10, 20, 30, 40 and 50.

Nozzle 10 connects with a milk hose (not shown) leading to the bottom of the milk pail (not shown). Nozzle 20 connects with a milk hose (not shown) leading to the milk chambers of the teat cups (not shown). Nozzle 30 connects with a milk and air hose (not shown) leading to the pail top. Nozzle 40 connects with a vacuum hose (not shown) leading to the pail top. Nozzle 50 connects with a vacuum hose (not shown) leading to the special vacuum pipe line (not shown).

In valve chamber $w$ is seated a plug valve $x$, which is provided with four channels, namely, an arcuate milk port 23, an arcuate air port 45, a milk passage 12 in open communication with milk pipe $b$, and an atmospheric port 32.

When the valve $x$ is turned into the position shown in Fig. 1, port 45 connects nozzels 40 and 50 and thereby connects the top of the pail with the vacuum pipe line, thus establishing a vacuum in the pail; and port 23 connects nozzles 20 and 30, thereby drawing milk from the teat cups into the milk pail.

Figure 2:
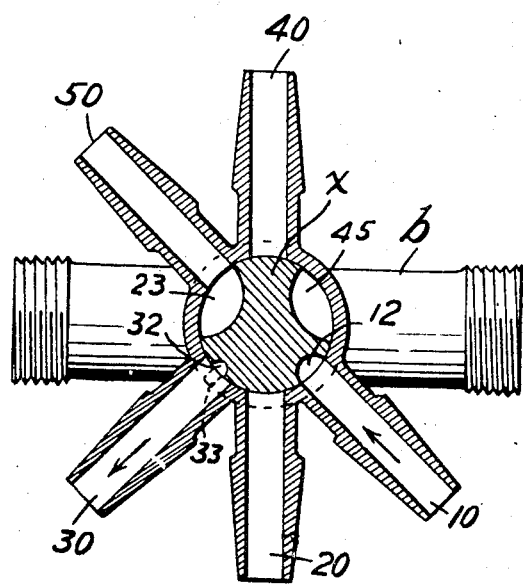
Figure 3:
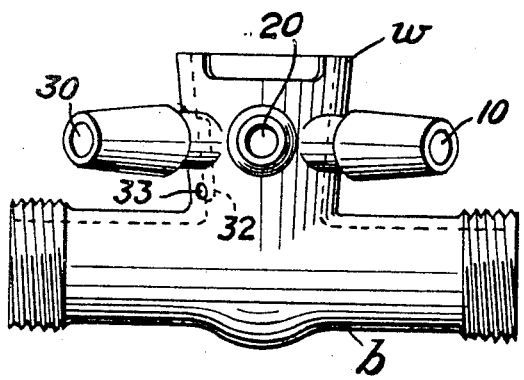
Fig. 3 is an elevational view of the valve structure of Figs. 1 and 2.
Figure 4:
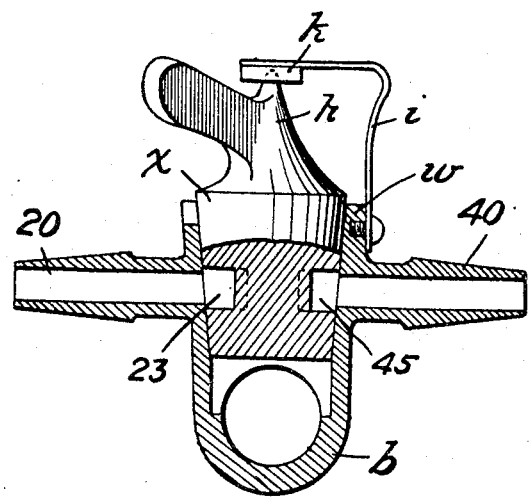
Fig. 4 is a sectional view showing the valve and two of such nozzles in longitudinal section and the milk pipe in cross-section.
Figure 5:
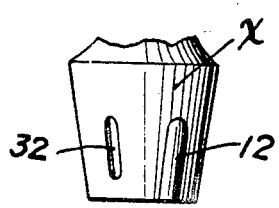
Fig. 5 is a side view of the tapered plug valve.

When the valve $x$ is turned into the position shown in Fig. 2 the above described connections are cut off, and air passage 32 is brought into communication with nozzle 30 and with a port 33 in the valve chamber, so that air flows into the top of the milk pail, and passage 12 is brought into communication with nozzle 10. The air pressure in the pail forces the milk out of the bottom of the pail, through nozzle 10 and passage 12, into the milk pipe line $b$.

When the valve $x$ is turned into an intermediate position, which may be called a neutral position, all the above connections are cut off.

While, in order to illustrate a useful embodiment of the invention, the valve structure is shown as one used in milking operations in order to direct the milk from teat cups into a pail and then discharge it into a pipe line communicating with a delivery reservoir (not shown), the structure may be found useful in other applications.

In order to hold the valve sufficiently tightly in its seat to prevent leakage while permitting turning and also to permit the valve to be readily removed for cleaning and to be readily replaced, the following construction has been devised. On the outer end of the valve $x$ is an axial projection $h$. Secured to the valve casing $w$ is one end of a bent leaf spring $i$ carrying at its free end a head $k$ having a recess in which the projection $h$ is seated. The tension of the spring is effective to hold the valve in its seat, but the free end of the leaf spring may be displaced to allow the valve to be withdrawn.

In the construction shown the nozzles 10, 20, 30, 40 and 50 are all in circumferential alignment, thereby permitting the plug valve to be of the desired minimum length. Leakage is avoided and the valve may be readily removed and replaced.

In claiming the positioning of the axes of the four pipes in approximately the same plane, I mean to include such close approximation to the same plane as will enable the employment of the described short valve.

I claim:

1. A master valve structure for controlling the flow therethrough of milk and air, which comprises a pipe section and a frusto-conical valve casing extending radially therefrom and communicating therewith, a turnable frusto-conical plug valve removably inserted in the valve casing, five pipes radiating from the valve casing in approximately the same plane, the valve having a passage adapted, in one position of the valve, to connect two of said pipes, a second passsage adapted, in the same position of the valve, to connect two other of said pipes, and a third passage adapted, in another position of the valve, to connect the fifth pipe with the pipe section.

2. A valve structure comprising a pipe section, a valve casing communicating with said pipe section, a turnable plug valve in the valve casing, and five pipes radiating from the valve casing; the valve having a passage adapted in one position of the valve, to connect one of the radiating pipes with the pipe section, said valve having another passage adapted in another of its said positions to connect two other of the radiating pipes, said valve having another passage adapted, in its last named position, to connect the remaining two radiating pipes, said valve being adapted, in its first named position, to close all of said pipes from communication one with another.

3. A valve structure comprising a pipe section, a valve casing communicating with said pipe section, a turnable plug valve in the valve casing and five pipes radiating from the valve casing; the valve having a passage adapted, in one position of the valve, to connect one of the radiating pipes with the pipe section, said valve having another passsage adapted in another of its said positions to connect two other of the radiating pipes, said valve having another passage adapted, in its last named position, to connect the remaining two radiating pipes, said valve having another passage adapted, in its first named position, to connect one of said pipes with the atmosphere.

4. A master valve structure for controlling the flow therethrough of milk and air, which comprises a valve casing having an air inlet port, a milk pipe line communicating with said valve casing, and five pipes radiating from the valve casing; the valve having one passage adapted, in one position of the valve, to connect two of said pipes, a second passage adapted, in the same position of the valve, to connect two other of said pipes, a third passage adapted, in another position of the valve, to connect the fifth pipe with the milk pipe line, and a fourth passage adapted, in the latter named position of the valve, to connect one of the first four pipes with the air inlet port.

5. A valve structure comprising a pipe section, a valve casing communicating with said pipe section, a turnable plug valve in the valve casing, and five pipes radiating from the valve casing; the valve having a passage adapted, in one position of the valve, to connect one of the radiating pipes with the pipe section, said valve having another passage adapted in another of its said positions to connect two other of the radiating pipes, said valve having another passage adapted, in its last named position, to connect the remaining two radiating pipes, all of said radiating pipes extending radially from the axis of the valve with their axes in approximately the same plane, whereby the valve may be of minimum length.

In testimony of which invention, I have hereunto set my hand, at city of New York, New York, on this 9th day of February, 1931.

CYRUS HOWARD HAPGOOD.